United States Patent [19]

Shimizu

[11] Patent Number: 4,828,062
[45] Date of Patent: May 9, 1989

[54] MOTOR-OPERATED POWER STEERING APPARATUS FOR VEHICLE WITH STEERABLE FRONT AND REAR WHEELS

[75] Inventor: Yasuo Shimizu, Saitama, Japan

[73] Assignee: Honda Giken Kogyo Kabushiki Kaisha, Tokyo, Japan

[21] Appl. No.: 102,229

[22] Filed: Sep. 29, 1987

[30] Foreign Application Priority Data

Sep. 29, 1986 [JP] Japan .................................. 61-230424

[51] Int. Cl.⁴ .............................................. B62D 5/04
[52] U.S. Cl. .................................... 180/140; 180/148; 180/154; 280/91
[58] Field of Search ............... 180/140, 141, 142, 79.1, 180/148, 154, 149; 280/91; 310/75 R, 83

[56] References Cited

U.S. PATENT DOCUMENTS

| 4,173,265 | 11/1979 | Kremer | 180/79.1 |
|---|---|---|---|
| 4,415,054 | 11/1983 | Drutchas | 180/142 |
| 4,646,867 | 3/1987 | Kanazawa | 180/140 |
| 4,683,971 | 8/1987 | Westercamp | 180/79.1 |
| 4,715,461 | 12/1987 | Shimizu | 180/79.1 |

FOREIGN PATENT DOCUMENTS

| 20565 | 2/1983 | Japan | 180/140 |
|---|---|---|---|
| 154955 | 8/1985 | Japan | 180/79.1 |
| 122080 | 6/1986 | Japan | 180/140 |
| 181777 | 8/1986 | Japan | 280/91 |
| 2119326 | 11/1983 | United Kingdom | 180/141 |

Primary Examiner—Charles A. Marmor
Assistant Examiner—Everett G. Diederiks, Jr.
Attorney, Agent, or Firm—Armstrong, Nikaido, Marmelstein, Kubovcik & Murray

[57] ABSTRACT

A motor-operated power steering apparatus for a vehicle with steerable front and rear wheels comprises a front wheel steering mechanism for turning the front wheels, the front wheel steering mechanism comprising a rack shaft having opposite ends adapted to support the front wheels through knuckle arms, respectively, a rack casing adapted to be fixed to a body of the vehicle, the rack shaft being axially movably supported by the rack casing, a rear wheel steering power output mechanism disposed substantially centrally on the rack shaft for extracting rear wheel steering power from the rack shaft, a pinion shaft operatively coupled to an end portion of the rack shaft in the rack casing through an operative coupling mechanism in a rack-and-pinion configuration for transmitting manual steering forces applied from a steering wheel, an electric motor disposed coaxially on the rack shaft between the rear wheel steering power output mechanism and the operative coupling mechanism for generating assistive steering power, and a ball screw mechanism extending parallel to the rack shaft remotely from the electric motor for axially moving the rack shaft in response to the assistive steering power generated by the electric motor. The motor-operated power steering apparatus also includes a rear wheel steering mechanism for turning the rear wheels, and a connecting shaft coupled to the rear wheel steering power output mechanism for transmitting rear wheel steering power from the front wheel steering mechanism to the rear wheel steering mechanism.

10 Claims, 3 Drawing Sheets

MOTOR-OPERATED POWER STEERING APPARATUS FOR VEHICLE WITH STEERABLE FRONT AND REAR WHEELS

BACKGROUND OF THE INVENTION

1. Field of the Invention

The present invention relates to a motor-operated power steering apparatus for a vehicle having steerable front and rear wheels, and more particularly to a rack-and-pinion motor-operated power steering apparatus having an electric motor for generating assistive steering power and transmitting such assistive steering power to the steerable front and rear wheels of a vehicle to turn the wheels.

2. Description of the Relevant Art

There are known motor-operated power steering apparatus having an electric motor for generating assistive steering power in a steering force transmitting system for front dirigible wheels. The assistive steering power produced by the motor is transmitted, together with manual steering forces applied to a steering wheel, to the front wheels thereby to lessen the steering efforts of the driver of a motor vehicle equipped with such a motor-operated power steering apparatus.

For example, U.S. Pat. No. 4,415,054 discloses a rack-and-pinion motor-operated power steering apparatus comprising a rack shaft axially movable supported in a rack casing, a pinion shaft having an upper end operatively coupled to a steering wheel and a lower end having a pinion gear meshing with rack teeth on one side of the rack shaft, and an electric motor disposed coaxially with the rack shaft for generating assistive steering power. The rack shaft has a helical groove defined on a central portion thereof and covered by the electric motor which is disposed in the rack casing. The electric motor comprises a number of magnets disposed on the inner peripheral surface of the rack casing in surrounding relation to the helical groove, a tubular armature surrounded by the magnets and disposed around the helical groove coaxially with the rack shaft, and a tubular ball nut fixed to the inner peripheral surface of the tubular armature and disposed around the helical groove coaxially with the rack shaft.

The electric motor is driven under the control of a signal representative of steering forces detected by a sensor associated with a torsion bar which interconnects the steering wheel and the pinion shaft. Rotative power generated by the motor is converted to axial movement of the rack shaft by means of a number of balls interposed between the ball nut member and the helical groove on the rack shaft.

The assistive steering power produced by the motor is transmitted, together with manual steering forces imposed on the steering wheel by the driver, to the front wheels, so that steering efforts can be reduced.

Recent years have seen the development of vehicles with steerable front and rear wheels, having a rear wheel steering mechanism for steering the rear wheels upon turning of the front wheels. Where the rack-and-pinion motor-operated power steering apparatus, as described above, is incorporated in such a vehicle with steerable front and rear wheels for the purpose of giving assistive steering power in turning the rear wheels as well as the front wheels, the motor-operated power steering apparatus must be mechanically coupled to the rear wheel steering mechanism through a connecting shaft and other members whereby the assistive steering power produced by the motor will be transmitted to the rear wheels to turn the rear wheels in response to turning of the front wheels.

The motor is positioned centrally on the rack shaft, and the pinion shaft coupled to the steering wheel is positioned on one side of the rack shaft, with the helical groove coupled to the motor and the rack teeth coupled to the pinion gear on the lower end of the pinion shaft being on the rack shaft substantially across the entire length thereof. Therefore, the design freedom for providing the rack shaft with a power output area for extracting assistive steering power for the rear wheels is substantially limited. Since such a power output area cannot be located in at least the central portion of the rack shaft, the connecting shaft cannot be positioned longitudinally through the central zone of the vehicle body which provides a dead space in the vehicle body, and hence good space utility cannot be achieved.

The power output area has to be positioned on one of the opposite ends of the rack shaft, or an extension thereof, or by dividing the rack shaft into two shaft members, in order that the motor-operated power steering apparatus can be connected to the rear wheel steering mechanism. However, such an arrangement results in an increased overall mechanism size, imposing limitations on the designing of the geometrical structure of front wheel steering linkages.

SUMMARY OF THE INVENTION

In view of the aforesaid drawbacks of the conventional motor-operated power steering apparatus, it is an object of the present invention to provide a motor-operated power steering apparatus for a vehicle with steerable front and rear wheels, which is capable of transmitting motor-generated assistive steering power to rear wheels without involving an increase in the size of a rack-and-pinion steering mechanism including an electric motor for turning front wheels.

According to the present invention, a motor-operated power steering apparatus for a vehicle with steerable front and rear wheels, comprises a front wheel steering mechanism for turning the front wheels, the front wheel steering mechanism comprising a rack shaft having opposite ends adapted to support the front wheels through knuckle arms, respectively, a rack casing adapted to be fixed to a body of the vehicle, the rack shaft being axially movably supported by the rack casing, a rear wheel steering power output mechanism disposed substantially centrally on the rack shaft for extracting rear wheel steering power from the rack shaft, a pinion shaft operatively coupled to an end portion of the rack shaft in the rack casing through an operative coupling mechanism in a rack-and-pinion configuration for transmitting manual steering forces applied from a steering wheel, an electric motor disposed coaxially on the rack shaft between the rear wheel steering power output mechanism and the operative coupling mechanism for generating assistive steering power, and a ball screw mechanism extending parallel to the rack shaft remotely from the electric motor for axially moving the rack shaft in response to the assistive steering power generated by the electric motor. The motor-operated power steering apparatus also includes a rear wheel steering mechanism for turning the rear wheels, and a connecting shaft coupled to the rear wheel steering power output mechanism for transmitting rear wheel steering power from the front wheel steering mechanism to the rear wheel steering mechanism.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
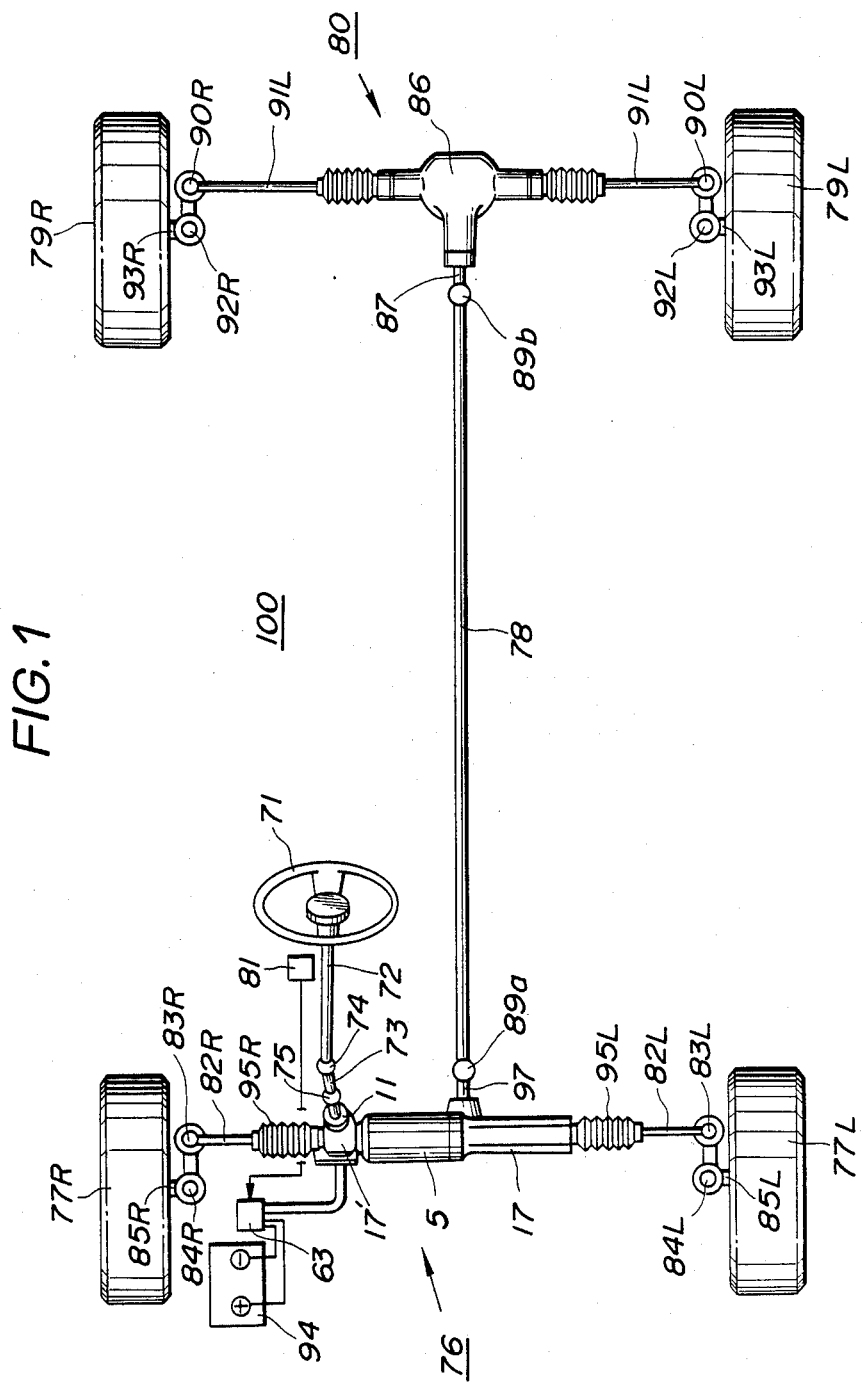
FIG. 1 is a plan view of a motor-operated power steering apparatus for a vehicle with steerable front and rear wheels according to the present invention.

FIG. 1 shows a motor-operated power steering apparatus, generally designated by the reference numeral 100, for a vehicle with steerable front and rear wheels.

The motor-operated power steering apparatus 100 basically comprises a rack-and-pinion front wheel steering mechanism 76 for turning front wheels 77L, 77R, a rear wheel steering mechanism 80 for turning rear wheels 79L, 79R, and a connecting shaft 78 extending longitudinally through a central portion of the vehicle and interconnecting the front and rear wheel steering mechanisms 76, 80. The front wheel steering mechanism 76 is coupled through a rack-and-pinion mechanism to a pinion shaft 11 which is operatively joined to a steering wheel 71 through a steering shaft 72, an intermediate shaft 73, and two universal joints 74, 75.

An ignition key switch 81 and a battery 94 are electrically connected to a control circuit 63 (described later on).

Figure 2:
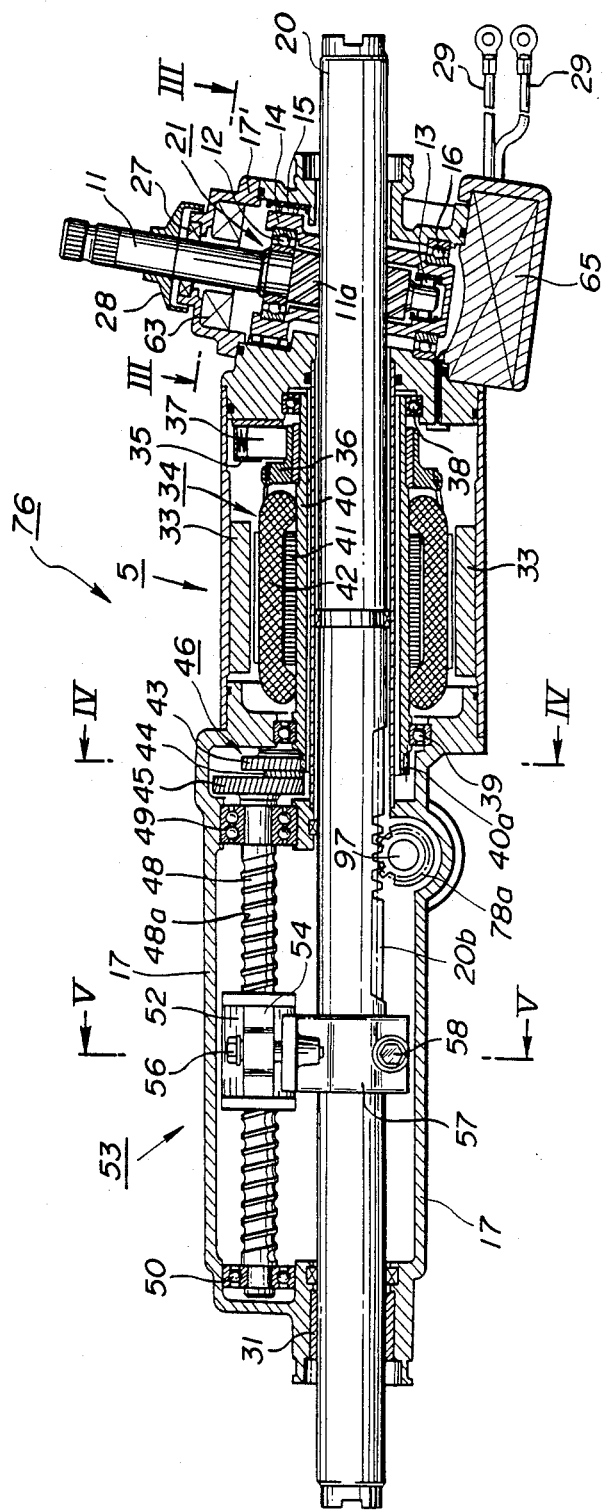
FIG. 2 is an enlarged fragmentary cross-sectional view of a front wheel steering mechanism of the motor-operated power steering apparatus.

As shown in FIG. 2, the front wheel steering mechanism 76 has an elongate rack casing 17 fixedly connected to a vehicle body and a rack shaft 20 disposed in and extends through a rack casing 17. The rack shaft 20 is axially movable supported in the rack casing 17 through a rack guide (not shown) near a pinion gear 11a at a righthand end (as shown) of the rack casing 17, and also through a journal bearing 31 in a lefthand end of the rack casing 17.

As shown in FIG. 1, the opposite ends of the rack shaft 20 project out of the rack casing 17 and are coupled to knuckle arms 85L, 85R supporting the respective front wheels 77L, 77R through tie rods 82L, 82R and ball joints 83L, 83R and 84L, 84R. The ends of the rack shaft 20 where they are coupled to the knuckle arms 85L, 85R are covered with dust boots 95L, 95R.

The pinion shaft 11 coupled to the steering wheel 71 has a lower portion operatively coupled to the front wheel steering mechanism 76. More specifically, a gear casing 17' is integrally mounted on the righthand end of the rack casing 17. The gear casing 17' houses therein an operative coupling mechanism by which the pinion shaft 11 and the rack shaft 20 are operatively coupled to each other for transmitting manual steering forces from the steering wheel 71 to the rack shaft 20.

The operative coupling mechanism includes a pinion wheel 14 rotatably supported in the gear casing 17' by means of bearings 15, 16, the pinion shaft 11 being rotatably inserted in the pinion holder 14 by means of bearings 12, 13. The pinion gear 11a is fixedly mounted on the distal end of the pinion shaft 11 and meshes with rack teeth (not shown) defined on the back (in FIG. 2) of the rack shaft 20, thus providing a rack-and-pinion mechanism. The center of rotation of the pinion holder 14 is displaced or offset from the center of rotation of the pinion shaft 11 for constituting a steering torque sensor 21, described below.

The steering torque sensor 21 and the control circuit 63 are disposed in an upper portion of the gear casing 17' in which the pinion shaft 11 and the pinion holder 14 are disposed. A motor driver circuit 65 for driving an electric motor 5 (described later) is housed in a lower portion of the gear casing 17'.

Figure 3:
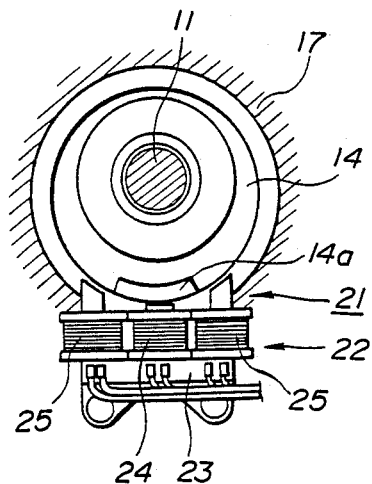
FIG. 3 is a cross-sectional view taken along line III—III of FIG. 2.

As shown in FIG. 3, the steering torque sensor 21 comprises a movable core 14a on an upper surface of the pinion holder 14, and a differential transformer 22 fixed fixedly mounted in the gear casing 17'. The differential transformer 22 has an E-shaped iron core 23 fixedly positioned in the gear casing 17', a primary coil 24 wound on the iron core 23, two secondary coils 25 wound on the iron core 23, and a compensating tertiary core (not shown) disposed around the primary coil 24. The steering torque sensor 21 detects a steering torque, i.e., a reactive steering force acting on the steering wheel 71, through displacement of the movable core 14a. With an AC pulse signal applied to the primary coil 24 from the control circuit 63, the secondary coils 25 differentially produce and apply steering torque signals to the control circuit 63 in response to relative displacement between the secondary coils 25 and the movable core 14a upon rotation of the pinion holder 14. As illustrated in FIG. 2, a sealing member 27 is disposed around the pinion shaft 11 and supported in the gear casing 17' which is covered with a cap 28. The driver circuit 65 is electrically coupled to the battery 94 through power cords 29.

The electric motor 5, which is housed in the rack casing 17, is disposed coaxially around the rack shaft 20 and extends from a position near the center of the rack shaft 20 to a position near the gear casing 17', for generating assistive steering power.

The electric motor 5 comprises a number of field magnets 33 secured to the inner peripheral surface of the rack casing 17, a rotor 34 rotatably disposed on the rack shaft 20 and covered by the field magnets 33 with a prescribed gap therebetween, and a commutator 36 accommodated in a holder 35 fixed to the rack casing 17 and slidably held against a brush 37.

The rotor 34 is rotatably supported in the rack casing 17 by means of bearings 38, 39, and has a tubular shaft 40 serving as an output shaft of the motor 5. The rotor 34 includes a laminated iron core 41 disposed around the tubular shaft 40 and having a skewed groove, and an armature multiplex winding 42 disposed around the laminated iron core 41, the iron core 41 and the winding 42 being coaxially and securely mounted on the tubular shaft 40. The armature winding 42 is electrically connected to the motor driver circuit 65 through the commutator 36 and the brush 37. The motor driver circuit 65 is controlled by the control circuit 63.

A speed reducer 46 and a ball screw mechanism 53 is disposed in the rack casing 17 above the rack shaft 20 and extend from a central area of the rack shaft 20 leftward of the motor 5 to the lefthand end of the rack shaft 20.

Figure 4:
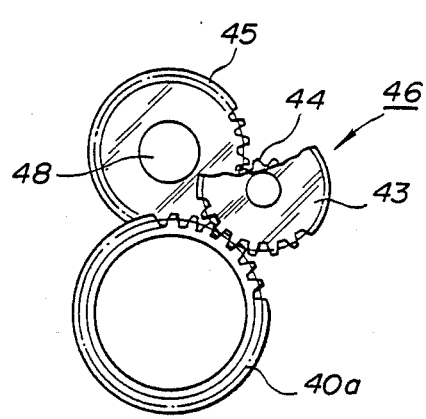
FIG. 4 is a cross-sectional view taken along line IV—IV of FIG. 2.

As shown in FIG. 4, the speed reducer 46 includes a gear 40a formed on an outer peripheral surface of the tubular shaft 40 at its end near the center of the rack shaft 20, a gear assembly comprising a gear 43 held in mesh with the gear 40a and rotatably supported in the rack casing 17, and a smaller-diameter gear 44 integrally coupled to the gear 43, and a larger-diameter gear 45 meshing with the smaller-diameter gear 44 and fixed to one end of a screw shaft 48. The speed reducer 46 is thus located in the rack casing 17 above the central area of the rack shaft 20.

Figure 5:
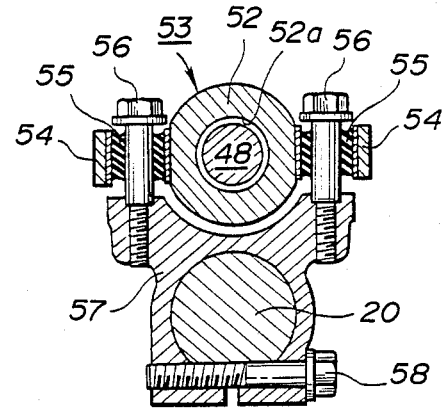
FIG. 5 is a cross-sectional view taken along line V—V of FIG. 2.

The ball screw mechanism 53 includes the screw shaft 48 which is rotatably supported above and parallel to the rack shaft 20 in the rack casing 17 by means of bearings 49, 50, a nut member 52 fitted over the screw shaft 48 with a certain gap therebetween, and a rack holder 57 coupled the nut member 52 and holding the rack shaft 20. The screw shaft 48 has a helical groove 48a defined in its outer peripheral surface over an axial length corresponding to the distance which the rack shaft 20 is axially movable. As shown in FIG. 5, the nut member 52 has a helical groove 52a defined in its inner peripheral surface. With a number of balls (not shown) riding in the helical grooves 48a, 52a, rotative power transmitted from the motor 5 through the speed reducer 46 to the screw shaft 48 can be converted through the balls to axial movement of the nut member 52 on the screw shaft 48.

The nut member 52 has a pair of flanges 54 extending in diametrically opposite relation and fixed to the rack holder 57 by means of bolts 56 extending through the flanges 54, respectively, with elastomeric bushings 55 interposed between the bolts 56 and the flanges 54. The rack holder 57 is securely fastened around the rack shaft 20 by a bolt 58. The rack shaft 20 is coupled to the nut member 52 by the rack holder 57 through the bolts 56 and the bushings 55. The nut member 52 is thus movable only axially in union with the rack shaft 20 which is gripped by the rack holder 57. The bushings 55 serve to absorb bending moment acting on the rack shaft 20 in response to a steering reactive force and to prevent unwanted load from being applied to the screw shaft 48 of the ball screw mechanism 53.

As shown in FIG. 2, the rack shaft 20 has rack teeth 20b defined on its lower surface extending between the rack holder 57 and the motor 5 over a prescribed length for transmitting steering power for turning the rear wheels 79L, 79R. The rack teeth 20b are held in mesh with a pinion gear 78a on an end of an output shaft 97 which transmits steering forces to the rear wheel steering mechanism 80. As illustrated in FIG. 1, the output shaft 97 is coupled to the rear wheel steering mechanism 80 through a universal joint 89a, the connecting shaft 78, and a universal joint 89b, for transmitting steering power from the front wheel steering mechanism 76 to the rear wheel steering mechanism 80. The rack teeth 20b and the output shaft 97 with the pinion gear 78a meshing therewith serve as a rear wheel steering power output mechanism.

In the above embodiment, the screw shaft 48 of the ball screw mechanism 53 is disposed upwardly of the rack shaft 20, and the rack teeth 20b of the rear wheel steering power output mechanism are formed on the lower surface of the rack shaft 20. However, the present invention is not limited to such structures. The screw shaft 48 may be disposed in another angular position radially spaced from the rack shaft 20, and the rack teeth 20b may be disposed on an upper surface of the rack shaft 20 so as to be out of physical interference with the screw shaft 48.

As shown in FIG. 1 the rear wheel steering mechanism 80 comprises a gear casing 86, as input shaft 87 rotatably supported in the gear casing 86, and coupled to the connecting shaft 78 through a universal joint 89b, and tie rods 91L, 91R coupled to the input shaft 87 through a gear mechanism (not shown) in the gear casing 86 and axially movable supported in the gear casing 86.

Rear wheel steering power transmitted via the connecting shaft 78 from the front wheel steering mechanism 76 is converted to axial movement of the tie rods 91L, 91R by the gear mechanism in the gear casing 86 for turning the rear wheels 79L, 79R which are operatively joined to the outer ends of the tie rods 91L, 91R through ball joints 90L, 90R and 92L, 92R and knuckle arms 93L, 93R.

In the motor-operated power steering apparatus 100, the control circuit 63 applies a control signal to the driver circuit 65 based on an output signal from the steering torque sensor 21 for controlling an electric current passing through the motor 5. The motor 5 thus generates assistive steering power commensurate with the steering torque and applies the assistive steering power to the rack shaft 20. The control circuit 65 may also be responsive to a signal from another sensor such as a temperature sensor for producing a control signal for the driver circuit 65. The assistive steering power generated by the motor 5 is transmitted, together with the manual steering forces from the steering wheel 71, to the front steering mechanism 76, thereby turning the front wheels 77L, 77R. Rear wheel steering power is also transmitted from the rack shaft 20 via the output shaft 97 and the connecting shaft 78 to the rear wheel steering mechanism 80 which then turns the rear wheels 79L, 79R through the tie rods 91L, 91R.

The direction in which the rear wheels 79L, 79R are turned, and the ratio of the turning angle of the rear wheels 79L, 79R to the turning angle of the front wheels 77L 77R are controlled dependent on a vehicle speed by an electric means housed in the gear casing 86. The turning direction and the turning angle ratio may be controlled such that when the vehicle runs in a low speed range, the rear wheels 79L, 79R are turned in the opposite direction to that of the front wheels 77L, 77R at a large turning angle ratio, and when the vehicle runs in a high speed range, the rear wheels 79L, 79R are turned in the same direction as that of the front wheels 77L, 77R at a small turning angle ratio.

The motor-operated power steering apparatus 100 is small in overall size with the rack shaft 20 being relatively short since the motor 5 is disposed coaxially with the rack shaft 20 and rear wheel steering power is transmitted from the rack teeth 90B on the rack shaft 20 between the nut member 52 and the motor 5, to the rear wheels 79L, 79R through the connecting shaft 78. Therefore, the rack shaft 20 can be positioned with increased design freedom. The geometrical configuration of the steering linkages such as the tie rods 82L, 92R for the front wheels can be designed easily with greater freedom. The dead space in the vehicle body can efficiently be utilized since the connecting shaft 78 for transmitting steering power from the front wheel steering mechanism 76 to the rear wheel steering mechanism 80 can be located centrally in the vehicle body.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated power steering apparatus for a vehicle with steerable front and rear wheels, comprising:
   a front wheel steering mechanism for turning the front wheels, said front wheel steering mechanism including
      a rack shaft having opposite ends to support the front wheels through knuckle arms, respectively;
      a rack casing to be fixed to a body of the vehicle, said rack shaft being axially movably supported by said rack casing;
      a rear wheel steering power output mechanism disposed substantially centrally on said rack shaft for extracting rear wheel steering power from said rack shaft;
      a pinion shaft coupled to an end portion of said rack shaft in said rack casing through an operative coupling mechanism in a rack-and-pinion configuration for transmitting manual steering forces applied from a steering wheel;
      an electric motor disposed coaxially on said rack shaft between said rear wheel steering power output mechanism and said operative coupling mechanism for generating assistive steering power; and
      a ball screw mechanism driven by said electric motor, said ball screw mechanism being spaced radially from said rack shaft and extending parallel to said rack shaft remotely from said operative coupling mechanism and said electric motor for axially moving said rack shaft in response to the assistive steering power generated by said electric motor said ball screw mechanism comprises a ball screw shaft connected to said electric motor and axially immovable and rotatably supported in said rack casing parallel to said rack shaft, a nut member axially movably disposed on said ball screw shaft with a plurality of balls therebetween and connected to said rack shaft, so that upon rotation of said screw shaft about an axis of said screw shaft the assistive steering power from said electric motor is converted to axial movement of said nut member to thereby axially move said rack shaft.

2. A motor-operated power steering apparatus according to claim 1, further including:
   a rear wheel steering mechanism for turning the rear wheels; and
   a connecting shaft coupled to said rear wheel steering power output mechanism for transmitting rear wheel steering power from said front wheel steering mechanism to said rear wheel steering mechanism.

3. A motor-operated power steering apparatus according to claim 2, further including:
   a steering torque sensor disposed in said operative coupling mechanism for detecting a reactive steering force acting on said steering wheel and generating a signal indicative of the detected reactive steering force;
   a motor driver circuit for driving said electric motor; and
   a control circuit for controlling said motor driver circuit to drive said electric motor in response to the signal from at least said steering torque sensor.

4. A motor-operated power steering apparatus according to claim 3, wherein said rack casing includes an integral gear casing, said operative coupling mechanism including a pinion holder rotatably supported in said gear casing, said pinion shaft being rotatably supported in said pinion holder in eccentric relation thereto.

5. A motor-operated power steering apparatus according to claim 4, wherein said steering torque sensor comprises:
   a movable core on said pinion holder; and
   a differential transformer fixedly mounted in said gear casing in confronting relation to said movable core for generating a differential signal in response to displacement of said movable core.

6. A motor-operated power steering apparatus according to claim 2, wherein said electric motor comprises a plurality of field magnetic disposed on an inner peripheral surface of said rack casing, and a rotor rotatably supported in said rack casing and surrounded by said field magnets, said rotor being disposed coaxially around said rack shaft with a gap therebetween, and wherein said ball screw mechanism comprises a ball screw rotatably supported in said rack casing parallel to said rack shaft, a nut member axially movable disposed on said ball screw with a plurality of balls therebetween, and a rack holder holding said rack shaft and coupled to said nut member through elastomeric members, whereby the assistive steering power from said electric motor can be converted to axial movement of said nut member upon rotation of said screw shaft about its own axis.

7. A motor-operated power steering apparatus according to claim 6, further including:
   a speed reducer comprising a first gear on the outer peripheral surface of an end of said rotor of the electric motor, a second gear fixed to an end of said screw shaft of said ball screw mechanism, and a gear assembly operatively interconnecting said first and second gears.

8. A motor-operated power steering apparatus according to claim 6, wherein said rear wheel steering power output mechanism comprises:
   rack teeth on said rack teeth out of physical interference with said screw shaft of the ball screw mechanism; and
   an output shaft having an end having a pinion gear meshing with said rack teeth, and an opposite end coupled to said connecting shaft.

9. A motor-operated power steering apparatus according to claim 8, wherein said screw shaft is disposed upwardly of said rack shaft, said rack teeth being disposed on a lower surface of said rack shaft remotely from said screw shaft.

10. A motor-operated power steering apparatus according to claim 1, wherein:
   said steering apparatus further comprises a rear wheel steering mechanism for steering said rear wheels, and a connecting shaft coupled to said rear wheel steering power output mechanism for transmitting rear wheel steering power from said front wheel steering mechanism to said rear wheel steering mechanism;
   said rear wheel steering power output mechanism comprises rack teeth formed on said rack shaft and a pinion gear coupled to a fore end of said connecting shaft and meshing with said rack teeth.

* * * * *